May 21, 1940. H. O. PETERSON 2,201,199
ULTRA SHORT WAVE APPARATUS
Original Filed April 2, 1934  3 Sheets—Sheet 1

INVENTOR
H. O. PETERSON
BY H. G. Grover
ATTORNEY

May 21, 1940.  H. O. PETERSON  2,201,199
ULTRA SHORT WAVE APPARATUS
Original Filed April 2, 1934   3 Sheets-Sheet 2

INVENTOR
H. O. PETERSON
BY *H G Grover*
ATTORNEY

May 21, 1940.　　　　H. O. PETERSON　　　　2,201,199
ULTRA SHORT WAVE APPARATUS
Original Filed April 2, 1934　　　3 Sheets-Sheet 3
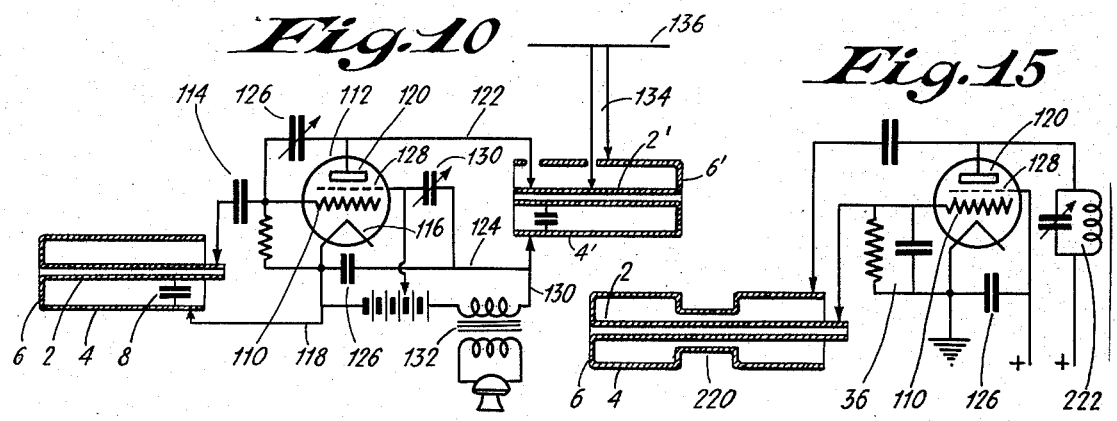
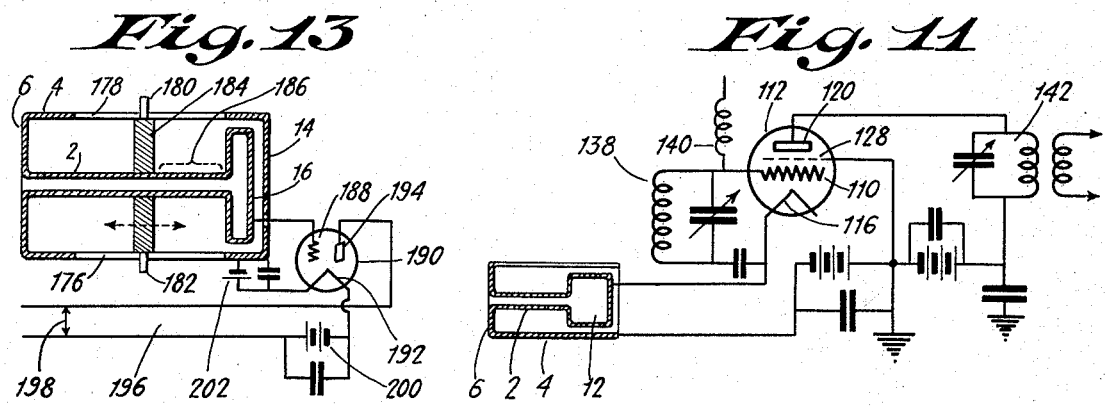
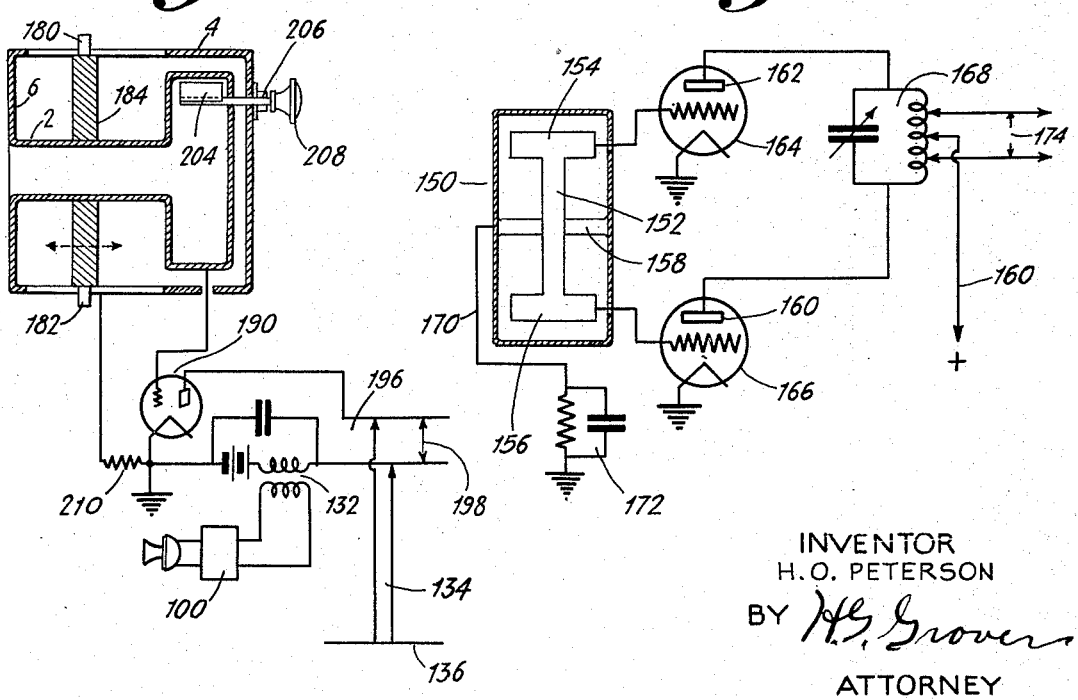
INVENTOR
H.O. PETERSON
BY H.G. Grover
ATTORNEY Patented May 21, 1940

2,201,199

UNITED STATES PATENT OFFICE 2,201,199

ULTRA SHORT WAVE APPARATUS

Harold Olaf Peterson, Riverhead, N. Y., assignor to Radio Corporation of America, a corporation of Delaware Application April 2, 1934, Serial No. 718,738
Renewed August 8, 1939

27 Claims. (Cl. 178—44)

The present invention relates to ultra short wave electrical apparatus and has for one of its objects the provision of tuned circuits which at high frequencies have extremely low power factors and which occupy relatively small spaces.

If the sources of loss in the conventional tuned circuit consisting of an inductance coil and a lumped capacitor are examined, it will be found that it is possible to reduce the loss in the capacitor by constructing it so as to utilize a low loss dielectric such as air or fused quartz while at the same time using a mechanical arrangement which will insure uniform distribution of current with a minimum of eddy current losses. The production of a very low loss inductance is more difficult. Thus, in the ordinary coil shaped inductor or inductance coil, it is practically impossible to obtain a uniform current distribution over the surfaces of the conductor at very high frequencies. And, even though a conductor having large circumference is provided, it will be found that most of the current crowds towards one side of this conductor when it is bent into a helical shape. Furthermore, eddy currents are set up in the surface of the conductor which may become serious when the size thereof is made large. To overcome the foregoing difficulties is one of the objects of my present invention, and I do so by providing an inductance system made of two hollow concentric metallic conductors or cylinders. By making the conductors coaxial and cylindrical, the current travels uniformly distributed over and down on the outside surface of the inner conductor and returns uniformly distributed over the inside surface of the outer conductor. Since the lines of magnetic flux are almost completely contained within the space between the outer conductor and the outside of the inner conductor, the possibilities of eddy current losses are minimized for the reason that the space through which the magnetic lines of force constituting the flux pass is nothing but air. Further, according to my present invention, I combine a low loss capacitance with a concentric tube inductance to produce a tuned circuit having an extremely low power factor.

A further and more specific object of my present invention is to provide a concentric tube circuit in which the inductance, capacitance or both may be varied for changing the frequency of operation thereof. Further objects of my invention are to provide improved circuit arrangements utilizing my improved concentric tube tuned circuits wherein high frequency waves may be amplified, generated, detected and filtered.

In the accompanying drawings which are only illustrative and in no way limitative of my present invention, Figures 1 to 6 inclusive illustrate various forms which ultra short wave length tuned circuits embodying the principles of my invention may take;

Figure 9:
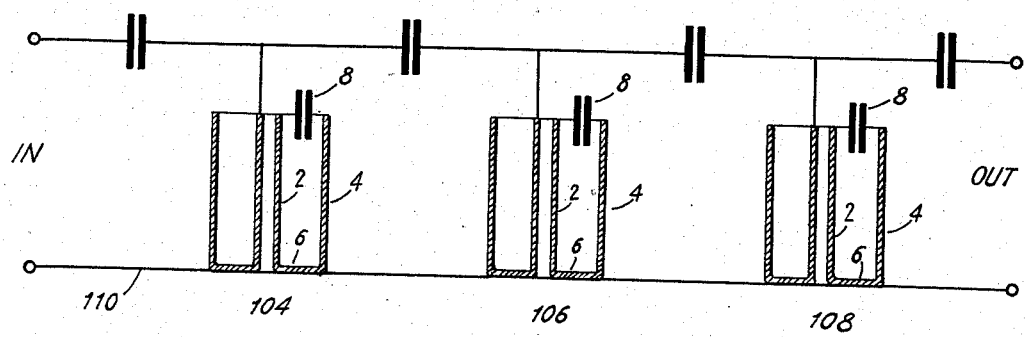

Figure 9 diagrammatically illustrates a filtering circuit utilizing concentric tubes as elements thereof;

Figures 10 to 15 inclusive are still further modifications of various circuits utilizing my improved concentric tube arrangements.

Figure 1:
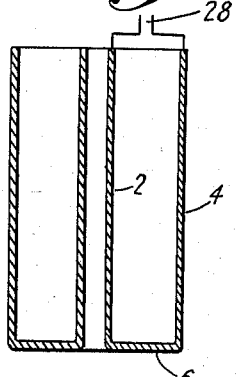

Figure 1 shows a concentric inductance consisting of two coaxial hollow metallic cylinders 2, 4 connected together at their bottom ends by means of a low direct current resistance connection here in the form of a metallic disc 6. In connection with the arrangement shown in Figure 1, and this is true also of all of the other concentric tube arrangements disclosed herein, conductors having cross sections other than that of a circle may be used, but it is preferable to use circular cross sections inasmuch as this will result in most uniform current distribution at the tube surfaces. Also, it is to be borne in mind in connection with Figure 1, and also in connection with all of the other modifications disclosed herein, that the two conductors should preferably be coaxial since a departure from the condition of coaxiality will result in a tendency towards unequal current distribution at the tube surfaces. Such an undesirable result follows because of the fact that current will flow over paths of less impedance. The tubes 2, 4 of Figure 1 are of such a length that their inherent inductance, together with the capacitance existing between them, will be resonant to a desired frequency of operation. This will be found to be, because of the capacity between the tubes, equal to a physical length somewhat less than a quarter wave length at the desired operating frequency.

Figure 2:
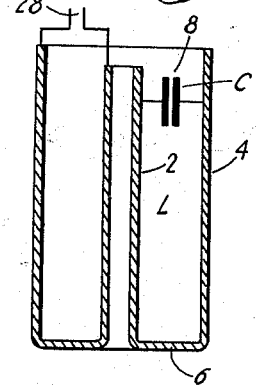

If desired, as shown in Figure 2, which illustrates a cross-sectional view of a concentric inductance, a capacitor 8 may be connected across the open ends of the tubes 2, 4. The capacitor 8 may be any lumped capacity such as a condenser having air insulation between its plates. Obviously, the condenser 8 may be connected in series with the inductance 2, 4, 6 and connected to some external circuit. When thus connected, the condenser 8 and the inductor 2, 4, 6 will form a very sharply tuned resonant circuit.

Figure 3:
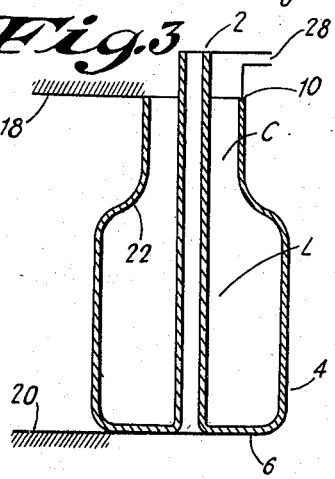

In Figure 3, the concentric inductance 2, 4, 6 is formed so that the outer tube 4 is bottle shaped or necked down at the open end 10. Because of the reduction in diameter of the outer tube 4, the reduced diameter portion, together with the adjacent portion of the inner conductor, forms effectively a lumped capacitor. A similar result may be obtained by expanding one end of the inner tube 2, as at 12 in Figure 5. If desired, the diameter of the inner tube may be expanded and the diameter of the outer tube contracted or reduced as to increase the lumped capacity effect.

Figure 4:
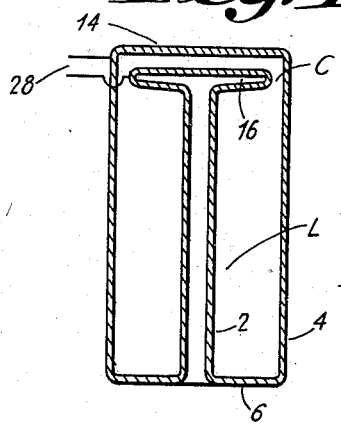

In the arrangement shown in Figure 4, the outer inductor tube is closed off at 14 and the inner tube 2 has its adjacent end expanded in the form of a disc-like head 16. An effective lumped capacity or condenser is formed between the portion 14 and the disc shaped head 16, the dielectric being air. The tuned circuit formed of this condenser and inductance provided by tubes 2 and 4 has the desirable property of being self-compensating for temperature effects. Thus, if the inner and outer conductors 2, 4 are made of the same material they will expand in accordance with the same temperature coefficient of expansion and, consequently, increase their inductances by the same coefficient. Since the thickness of the air dielectric is the difference of the two lengths of the conductors 2, 4, it follows that the coefficient of change of this thickness will be the same as the coefficient of change in length. Consequently, as increase in temperature causes the inductance to increase, the thickness of the dielectric will increase, causing the resonant frequency to remain practically constant. Of course, the diameter of the disc shaped electrode 16 of the condenser will vary with temperature, but this effect can be minimized by constructing the disc of invar, plated with a highly conductive material, it being noted that invar experiences very little change of physical dimensions with changes of temperature.

Figure 6:
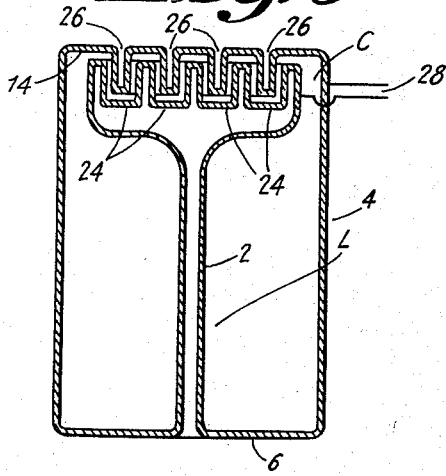

With the arrangement shown in Figure 3, the effect of temperature change may be avoided by supporting the outside conductor 4 between non-expanding supports 18, 20 whereby the spacing between the inside corner 22 of the neck and the bottom end cannot vary. The arrangement shown in Figure 6 has the same tendency towards temperature compensation as the tuned circuit shown in Figure 4. In the circuit of Figure 6, one end of the inner tube 2 is expanded into a head having a plurality of cylinders 24 intercalated with cylinders 26 formed in the upper portion 14 of the outer cylindrical tube 4. By this means, the effective lumped capacity is materially increased, giving rise to a resonant circuit wherein the tubing is substantially less than a quarter wave length long, considered from a physical standpoint, taken at a desired operating frequency.

In each of the modifications shown in Figures 1 to 6 inclusive, connection is made to the elements of the tuned circuits by means of conductors 28 when it is desired to obtain parallel resonance effects. Also, the tubes may be filled with a low loss dielectric, if desired, such as pure sulphur or pure water, or facing surfaces of the tubes may be covered with mica. Also, to enhance frequency stability the tuned circuits of Figures 1 to 6, and also any of the other circuits shown hereinafter, are preferably rigidly mounted, and may be, if desired, placed within an hermetically sealed container and temperature controlled. As an added precaution, the circuits may be placed within an evacuated container before being placed within a temperature control box so as to prevent moisture from condensing upon the surfaces thereof, although this undesirable effect may be avoided by simply maintaining the elements above room temperature. It will, of course, be appreciated that the inner concentric conductor may, if desired, be a solid rod instead of a tube.

Figure 7:
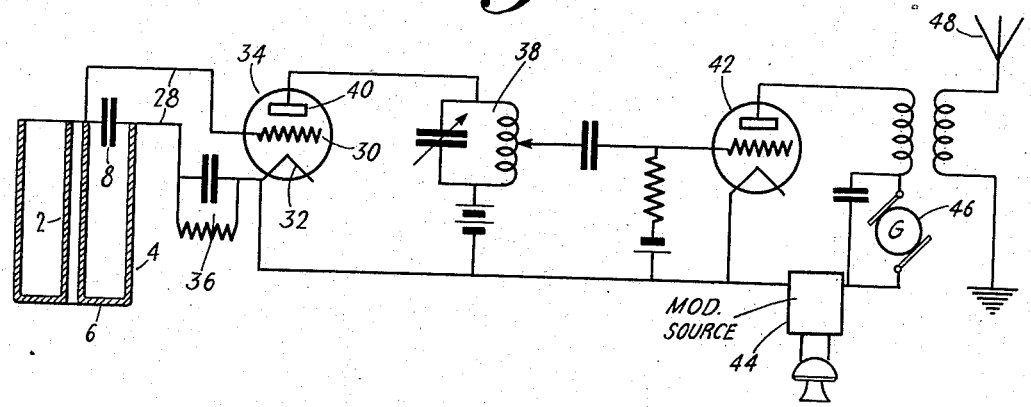
Figure 7 illustrates a transmitting system having an oscillation generator utilizing for frequency control a concentric tube circuit.

Figure 7 indicates the application of my improved concentric tube inductor and capacitor to a transmitting system. The tuned circuit 2, 4, 6, 8 of Figure 2 is connected in Figure 7 through leads 28 to the grid 30 and cathode 32 of a multi-electrode discharge device or vacuum tube 34. Grid bias is provided by the action of a grid leak and condenser arrangement 36. An additional high frequency circuit, here shown diagrammatically as a tuned circuit 38, is connected between the anode or plate 40 and the cathode 32. Oscillation generation takes place by virtue of the inter-electrode capacity existing between the plate 40 and grid 30 and takes place at a frequency determined by the tuning of the circuit 2, 4, 6, 8. At the very short wave lengths involved, it will be found that the circuit, 2, 4, 6, 8 serves to very accurately maintain and stabilize oscillation generation at the frequency to which it is tuned. The circuit 2, 4, 6, 8 may, of course, be replaced by any one of the circuits shown in Figures 1 to 6 inclusive.

Output energy from circuit 38 is fed to a power amplifier 42 whose output is modulated by any suitable modulation source 44 whose voltage is superimposed upon the voltage of the plate voltage generator 46. The modulated waves are then radiated over any suitable antenna 48 inductively coupled to the plate circuit of tube 42 which is preferably tuned to the desired operating frequency.

Figure 8:
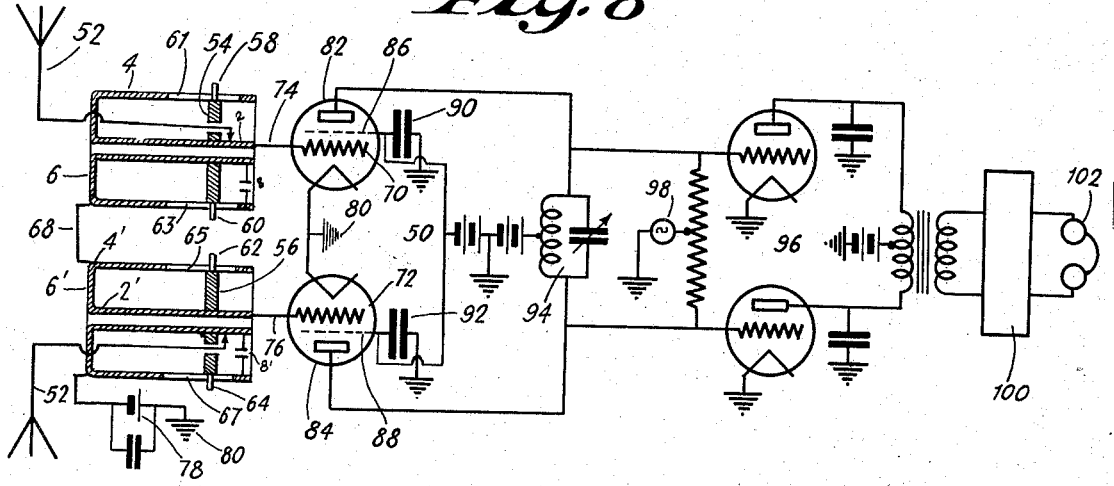
Figure 8 illustrates a receiving system making use of concentric tubes for tuning purposes.

In Figure 8, I have shown the application of the principles of my present invention to a receiver. Briefly, concentric inductances are used in connection with the tuning of the grid circuits of a push-pull high frequency amplifier stage 50. The low power factor obtainable results in a very selective circuit and enables a sufficiently high impedance to be built up in the grid circuit even at exceedingly short wave lengths. It is preferable that a concentric inductor or conductor controlled oscillation generator be used as the local oscillator in this receiver.

Turning more specifically to Figure 8, the antenna 52 is connected to the inner tubes 2 and 2' of the concentric conductor systems, 2, 4, 6, and 2', 4', 6'. These concentric tube inductors are provided with metallic rings or annuli 54, 56 slidable along and between and conductively connecting the tubes 2, 4, and 2', 4'. Movement is effected by means of ears or prongs 58, 60, 62, 64 extending through slots 61, 63, 65, 67 cut into the outer tubes 4, 4'. The outer tubes 4, 4' are connected together by means of a low resistance connection 68 and the inner tubes 2, 2' are connected to the grids 70, 72 by means of conductors 74, 76. Grid bias is accomplished by means of battery 78 connected between the outer metallic tubes 4, 4' and ground 80.

Movement of the rings 54, 56 by means of the prongs 58, 60, 62, 64 will enable tuning of the concentric conductors systems 2, 54, 4, 8 and 2', 56, 4', 8' to a desired frequency. The voltages resonated upon concentric tubes are impressed upon the grids 70, 72 of the high frequency amplifier stage which comprises a pair of tubes 82, 84 connected in push-pull and provided with screen grids 86, 88 by-passed to ground by means of condensers 90, 92. At the high frequencies involved, it is sometimes preferable that condensers 90, 92 be made small so as to series resonate with the leads to the screen grids 86, 88, thereby effectively maintaining them at ground radio frequency potential at the received high frequency. A clamping device may be placed around cylinder 4 or 4' to firmly secure rings 54 or 56.

The output of the tuned radio frequency amplifier stage 50 is resonated in a tuned output circuit 94, in turn coupled to the grids of the push-pull connected detector stage 96. This stage is also supplied with heterodyning energy from a local source 98 which, preferably, is an oscillation generator controlled in frequency by a concentric tube system such as shown in Figures 1 to 6 inclusive. More specifically, the local oscillation generator 98 may be supplied with output from an oscillation generator, such as tube 34 of Figure 7, or from an oscillation generator such as will be described more fully hereinafter in connection with Figures 10 to 15 inclusive. Preferably, the local oscillation generator 98 is operated at a frequency to give a heterodyne beat frequency with the incoming waves in the output of the push-pull detector 96. The beat frequency signal may be fed into any suitable amplifier 100 and translated into sound, if desired, by means of earphones 102. It is to be clearly understood, however, that the local oscillation generator 98 may be operated so that the output of the detector 96 will be super-audible or even high radio frequency intermediate frequency output, in which case amplifier 100 would contain a second detector and suitable amplifiers, or, if desired, further local oscillation generators, detectors and amplifiers for beating the incoming wave down several times to various intermediate frequencies before being detected so as to give the audio frequency signal transmitted.

So far, I have described my improved concentric inductor or conductor system in connection with oscillation generators, amplifiers and detectors. It may, however, be utilized to good advantage to form a band pass filter arrangement. For example, I have shown in Figure 9 a band pass filter utilizing concentric tube elements 104, 106, 108 each of which may be, for example, any one of the concentric tube systems described in this application. Obviously, any number of such concentric tube systems might be used in a filter arrangement, or combinations of different ones of the concentric tube devices may be used without departing from the scope and breadth of my present invention. The elements may be connected so as to form either high or low pass filter units. Also, various modifications should be self-apparent, such as the duplication of the system shown in Figure 9 by another similar system so arranged that the conductor 110 of the other system coincides with that of the conductor 110 of Figure 9, thereby effecting a "back to back" filter arrangement.

Returning for a moment to the circuits of Figures 7 and 8, tuned circuits 38, 94 have been illustrated as conventional tuned circuits. It is to be clearly understood, however, that these circuits need not be of the coil and condenser variety, but may be circuits such as shown in Figures 1 to 6 inclusive, or may simply be any circuit such as a pair of linear conductors having uniformly distributed inductance and capacity and so adjusted in length as to offer proper impedance to the operating frequency. An oscillation generator having concentric tube input and output circuits for frequency control and stabilization is illustrated in Figure 10.

Referring more specifically to Figure 10, the concentric tube system 2, 4, 6, 8, which may be, as already expressed, any one of the circuits shown in Figures 1 to 8 inclusive, is connected to the grid 110 of vacuum tube 112 by way of condenser 114 and to the cathode 116 by way of conductor 118. The plate or anode 120 is connected to the inner tube 2' of a similar concentric inductor system by way of conductor 122 and the radio frequency anode or plate circuit is completed to the cathode by way of the outer tube 4', conductor 124 and by-passing condenser 126.

For the generation of oscillations, reliance may be placed upon the inter-electrode capacity existing between the plate 120 and the grid 110 and this feed-back may be augmented by means of a variable feed-back condenser 126, or, by the provision of a screen grid 128, condenser 126 may form the sole source of feed-back energy, in which case care should be taken to adjust condenser 130 so as to series resonate with the lead to the screen grid so as to effectively maintain it at cathode or ground potential at the high frequencies involved.

The output of the oscillation generator is modulated by means of audio frequency voltages introduced into the plate supply lead 130 by means of audio frequency transformer 132. Modulated output is taken, as shown, through transmission lines 134 and connected to the tuned plate circuit 2', 4', 6' and fed into a radiating antenna 136.

Figure 5:
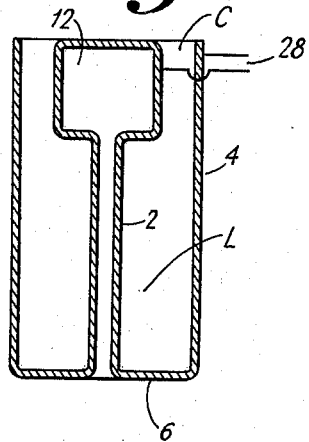

Figure 11 illustrates an oscillation generator wherein an improved concentric tube circuit is used for frequency control, but wherein the load circuit is coupled to the oscillation generating circuit by way of the electron stream within the vacuum tube or multi-electrode device. The multi-electrode device 112 of Figure 11 is provided with an anode 120, a screen grid 128, a control grid 110 and a cathode 116. The screen grid 128 is grounded, as indicated, and between it and the cathode there is connected a concentric tube circuit 2, 4, 6, the inner tube 2 of which has a head expansion 12, such as illustrated in Figure 5, in order to increase the capacity of the tuned circuit 2, 4, 6. The circuit 138 connected between the control grid 110 and the cathode 116 is illustrated conventionally, but may be another concentric tube circuit such as shown in any one of Figures 1 to 6 inclusive, or may be simply a pair of Lecher wires adjustable in length. Grid bias is fed through a choke coil 140. The plate or anode circuit 120 is also shown conventionally as a tunable circuit 142, but this circuit, too, may be of the type shown in Figures 1 to 6 inclusive or may be merely a pair of Lecher wires adjustable in length. Oscillations are set up by virtue of the inter-electrode capacity existing between cathode 116 and control grid 110 and output energy is derived from the oscillatory system by virtue of electron stream coupling within the tube. The output circuit 142, it is to be noted, may be tuned to the same frequency or to some harmonic of the frequency of oscillations which are controlled in frequency by the concentric tube system 2, 4, 6, 12.

Figure 12 illustrates a push-pull connected oscillation generator frequency controlled by a modified form of concentric tube system. Here, the concentric tube frequency controlling the arrangement consists of an outer cylinder or drum 150 within which is supported a metallic cylindrical tube or member 152 having enlarged disc-like heads 154, 156. Preferably, the inner tube 152 and its attached heads are made hollow and, naturally, are made metallic. They are supported within the drum 150 at their center point by means of a metallic supporting disc or any other suitable arrangement, such as arms 158. Between the anodes 160, 162 of the tubes 164, 166, there is connected a tuned circuited 168. This circuit is shown conventionally, but may be an arrangement similar to 150, 152, 154, 156, 158, in which case the plate supply lead 160 would be connected to the corresponding drum 150 in much the same manner as the grid leak return conductor 170 is connected. Also, in that event, the plates 162, 160 would be connected to heads within the plate arrangement corresponding to the enlarged heads 154, 156 of the grid circuit. As before, oscillation generation takes place by virtue of inter-electrode feed-back within the tubes, proper grid bias being maintained by the action of grid leak and condenser circuit 172. Output energy is taken from the generator in any suitable way, as, for example, by conductors 174.

In the arrangement shown in Figure 13, the concentric tube frequency controlling circuit is similar to that shown in Figure 4 except that the slots 176, 178 are provided in the outer tubular conductor 4 through which protrude the handles or ears 180, 182 for moving the metallic tuning ring or annulus 184. The ring may be moved either to the left or right, as indicated, and the effective length 186 of the inner tube determines the tuning of the concentric tube conductor system of Figure 13. The enlarged head 16 is connected to the grid 188 of tube 190 and the outer tube 4 is connected to the cathode 192, the source of heating energy for it being omitted for the sake of simplicity. Between the anode 194 and the cathode 192 there is connected, as shown, a Lecher wire system 196 having an adjustable short circuiting tuning strap 198 for tuning purposes. The batteries 200, 202 are by-passed, as illustrated, with the usual by-passing condensers and may be poled or connected so as to maintain the grid negative and the plate positive with respect to the cathode for regenerative action, in which case feed-back takes place by virtue of the inter-electrode capacity of tube 190. If desired, the polarities may be reversed, in which case the plate will be maintained at either zero or a slightly negative potential with respect to the cathode and the grid at a positive potential with respect to the cathode. With this reversal of polarities oscillation generation will take place by virtue of the Barkhauzen-Kurz effect, electrons attracted towards the grid by view of the positive charge thereon being reattracted towards it after they have passed through it by virtue of the positive charge which is now behind them and the braking action of the negatively charged plate or anode. In this manner, a pendulum-like oscillation of the electrons takes place through and about the control grid. Incidentally, while on the subject it is to be clearly understood, in addition, that while most of the modifications shown herein have specifically referred to regenerative action, potentials may be supplied as just indicated so as to obtain either Barkhauzen-Kurz oscillations or dynatron oscillations, in which cases my improved tuned circuits will serve admirably well for the amplification, generation and detection of waves amplified, generated or detected by those methods. Also, not only are my improved concentric tube systems adapted for use in regenerative, dynatron and Barkhauzen-Kurz circuits, but they may be applied equally as well to circuits wherein magnetron action is employed.

In the arrangement shown in Figure 14, not only is there provided an arrangement for varying the effective inductance of my concentric tube system by means of a sliding ring 184, but also I have provided a rotatable capacity element 204 electrically connected to the outer conductor 4 by means of shaft 206. 204 is preferably in cross section and semi-circular in shape so that as it is rotated by means of knob 208 the effective capacity between the inner and outer conductors may be very accurately controlled. As in the case of Figure 13, the plate circuit of tube 190 is in the form of an adjustable Lecher wire system 196 tunable by means of a strap 198. Output energy from the circuit 196 is fed through transmission line 134 to a suitable radiating antenna 136. Amplified modulating potentials are supplied from amplifier 100 before being applied to the plate circuit through transformer 132. Grid bias is obtained by the action of a resistor 210 which may have added thereto in parallel if desired, a condenser.

In the system shown in Figure 15 the lumped capacitor 8 of Figure 2 is formed by indenting the outer conductor 4 intermediate its ends as at 220. If desired, the inner conductor 2 may be expanded at this portion so as to increase the lumped capacity at the center of my concentric tube system 2, 4, 6. Here, too, the concentric tube system is connected for high frequency currents between the plate 120 and the control grid 110, proper grid bias being insured by the action of a grid leak and condenser arrangement 36. Inter-electrode feed-back other than that to the concentric tube arrangement 2, 4, 6 is effectively prevented by the action of screen grid 128 grounded for radio frequency currents by a suitable condenser 126. While the plate circuit 222 has been illustrated in the usual conventional form, it may be replaced, as explained before, by any one of the concentric tube systems described herein, or it may be replaced by a Lecher wire system of adjustable length.

Having thus described my invention, what I claim is:

1. In combination, a tuned high frequency circuit comprising an enclosed cylinder, a hollow cylindrical member within said cylinder, said member having hollow enlarged ends of appreciable length compared to the length of said member, said hollow ends communicating with the interior of said cylindrical member.

2. A tuned high frequency circuit comprising an outer conductor and a hollow coaxial concentric conductor, both coupled together at one end, means for capacitively coupling said conductors together at the other end comprising a hollow portion of larger diameter for and communicating with the interior of said inner conductor, a metallic covering for the end of said hollow portion and a metallic covering for the adjacent end of said outer conductor, said hollow portion being so constructed and arranged with respect to the adjacent end of said outer conductor as to increase the effective capacitance between said inner and outer conductors, and means in circuit with both of said conductors for tuning said high frequency circuit.

3. A tuned high frequency circuit comprising an outer conductor and an inner concentric conductor, both coupled together at one end, means for capacitively coupling said conductors together at the other end comprising a hollow portion of larger diameter for said inner conductor and including a metallic covering for the end of said hollow portion and a metallic covering for the adjacent end of said outer conductor, said hollow portion communicating with the interior of said inner conductor and being so constructed and arranged with respect to the adjacent end of said outer conductor as to increase the effective capacitance between said inner and outer conductors.

4. A tuned high frequency circuit comprising an outer conductor and a hollow coaxial inner conductor, means for capacitively coupling said conductors together at both ends comprising at each end of said inner conductor a hollow portion of larger diameter and including a metallic covering for each of said hollow portions and adjacent thereto a metallic covering for said outer conductor, each of said hollow portions communicating with the interior of said inner conductor and being so constructed and arranged with respect to the adjacent end of said outer conductor as to increase the effective capacitance between said inner and outer conductors.

5. A tuned high frequency circuit comprising an outer conductor and an inner concentric conductor, both coupled together at one end, means for capacitively coupling said conductors together at the other end comprising a hollow portion of larger diameter for said inner conductor and including a metallic covering for the end of said hollow portion and a metallic covering for the adjacent end of said outer conductor, said hollow portion being so constructed and arranged with respect to the adjacent end of said outer conductor as to increase the effective capacitance between said inner and outer conductors, and means intermediate the ends of said conductors for adjustably coupling said conductors together conductively at points along the lengths of said conductors.

6. A high frequency circuit in accordance with claim 5, characterized in this that said last means comprises an annular ring contacting the outer surface of said inner conductor and the inner surface of said outer conductor, including means extending from said annular ring externally of said outer conductor for varying the position of said ring over the lengths of said conductors.

7. An ultra high frequency oscillatory circuit comprising inner and outer concentric tubular conductors which are coupled together at both ends, said conductors being capacitively coupled together at least at one end, said capacitive coupling comprising a hollow metallic drum electrically connected to and mounted on said inner tubular conductor, the outer end of said drum being electrically closed, said drum being spaced from said outer tubular conductor and having its interior communicating with the interior of said inner conductor.

8. An ultra high frequency oscillatory circuit comprising concentric inner and outer conductors, means for capacitively coupling said inner and outer conductors together at one end comprising a pair of spaced metallic plates individually coupled to said conductors at said end and facing each other, and means for adjustably coupling said conductors together at points along the lengths of said conductors.

9. A circuit in accordance with claim 8, characterized in this that said means comprises a cylindrical metallic ring located between the inner surface of the outer conductor and the outer surface of the inner conductor.

10. A circuit in accordance with claim 7, including means for varying the capacity between said drum and said outer tubular conductor.

11. A circuit in accordance with claim 7, including an element conductively coupled to said outer conductor and slightly spaced away from said drum for varying the capacity therebetween.

12. An ultra high frequency oscillatory circuit comprising concentric inner and outer conductors conductively coupled together at one end and capacitively coupled together at the other end and having means intermediate the ends for adjustably coupling said conductors together conductively at points along the lengths of said conductors.

13. In combination, a tuned high frequency circuit comprising an enclosed cylinder, a hollow cylindrical member within said cylinder, said member having enlarged hollow ends communicating with the interior of said member.

14. An ultra high frequency oscillatory circuit comprising concentric inner and outer conductors conductively coupled together at one end, means within the outer conductor for capacitively coupling together said inner and outer conductors at their other end, and means intermediate the ends of said conductors and conductively coupled thereto for adjustably coupling same together at points along the lengths of said conductors.

15. An ultra high frequency oscillatory circuit comprising concentric inner and outer hollow conductors conductively coupled together at one end, a first metallic end plate covering the other end of said outer conductor, a second metallic plate conductively coupled to said inner conductor also at said other end and spaced from said first plate to provide a capacitive coupling therebetween, adjustable means within said inner conductor for varying said capacitive coupling, and means intermediate the ends of said conductors for adjustably coupling said conductors together at points along the lengths of said conductors.

16. An ultra high frequency oscillatory circuit comprising concentric inner and outer conductors conductively coupled together at one end, means within the outer conductor for capacitively coupling together said inner and outer conductors at their other end, a disc intermediate the ends of said conductors and electrically contacting the outer surface of said inner conductor and the inner surface of said outer conductor, a slot in the outer conductor along a portion of the length thereof, and a projection secured to said disc and extending through said slot for enabling adjustment of said disc over the lengths of said conductors.

17. An ultra high frequency oscillatory circuit comprising concentric inner and outer conductors conductively coupled together at one end, means within the outer conductor for capacitively coupling together said inner and outer conductors at their other end, a disc intermediate the ends of said conductors and electrically contacting the outer surface of said inner conductor and the inner surface of said outer conductor, said outer conductor having a plurality of parallel slots along a portion of the length thereof, and projections secured to said disc and extending through said slots for enabling adjustment of said disc over the lengths of said conductors.

18. An ultra high frequency oscillatory circuit comprising concentric inner and outer hollow conductors conductively coupled together at one end, a first metallic end plate covering the other end of said outer conductor, a second metallic plate conductively coupled to said inner conductor also at said other end and spaced from said first plate to provide a capacitive coupling therebetween, adjustable means within said inner conductor and extending externally of said outer conductor for varying said capacitive coupling, and means intermediate the ends of said conductors for adjustably coupling said conductors together at points along the lengths of said conductors.

19. An ultra high frequency oscillatory circuit comprising inner and outer concentric tubular conductors which are coupled together at both ends, said conductors being capacitively coupled together at least at one end, said capacitive coupling comprising a hollow metallic drum electrically connected to and mounted on said inner tubular conductor, said drum being spaced from said outer tubular conductor and having its interior communicating with the interior of said inner conductor, and a capacity element spaced from and adjacent said drum, said element being connected to said outer tubular conductor, whereby movement of said element varies the capacity between said drum and said outer tubular conductor.

20. An ultra high frequency circuit as defined in claim 19, characterized in this that said capacity element is located within said drum.

21. An ultra high frequency oscillatory circuit comprising concentric inner and outer hollow conductors directly coupled together at one end and having means intermediate the ends for adjustably coupling said conductors together at points along the lengths of said conductors.

22. A tuning device comprising a pair of conductors disposed one within the other, the inner of said members constituting an inductance element, a metallic member slidably mounted on the inner of said conductors, said metallic member contacting with and electrically connecting said conductors, and plate members carried by and electrically connected to said conductors and forming a condenser.

23. A tuning device comprising a pair of conductors disposed one within the other and one of which constitutes the inductive element of the device, means for varying the effective length of said one conductor, and means including members integral with said conductors forming a variable condenser in shunt with said inductive element.

24. A tuning device comprising a tubular metallic member having a laterally extending plate portion, a metallic rod within said tubular member and constituting an inductive element, a metallic member slidably mounted on said rod and electrically connecting said rod to said tubular member, and a plate member mounted on and electrically connected to said rod, said plate member being disposed in juxtaposition to said plate portion and forming a condenser therewith.

25. A tuning device comprising a pair of conductors disposed one within the other, the inner of said members constituting an inductance element, a path of very low impedance to energy of the operating frequency connecting said pair of conductors together at one end, and a metallic member slidably mounted on the inner of said conductors, said metallic member contacting with and electrically connecting said conductors at points intermediate the ends thereof.

26. A tuned circuit comprising concentric inner and outer hollow conductors suitably coupled together and having means intermediate the ends for adjustably coupling said conductors together at points along the lengths of said conductors, said tuned circuit including a path of very low impedance to energy of the operating frequency connecting said conductors together at one end.

27. A tuned circuit comprising concentric inner and outer conductors conductively coupled together at one end and capacitively coupled together at the other end and having means intermediate the ends for adjustably coupling said conductors together at points along the lengths of said conductors.

HAROLD OLAF PETERSON.